(12) United States Patent
Conrad et al.

(10) Patent No.: US 8,235,004 B2
(45) Date of Patent: Aug. 7, 2012

(54) PET CO-SLEEPER

(75) Inventors: Derek Conrad, Riverside, CA (US);
Douglas Tharalson, Agoura, CA (US);
Diana Tharalson, Agoura, CA (US)

(73) Assignee: Baby Trend Inc., Ontario (CA)

( * ) Notice: Subject to any disclaimer, the term of this patent is extended or adjusted under 35 U.S.C. 154(b) by 632 days.

(21) Appl. No.: 12/248,853

(22) Filed: Oct. 9, 2008

(65) Prior Publication Data
US 2009/0090302 A1     Apr. 9, 2009

Related U.S. Application Data

(60) Provisional application No. 60/978,734, filed on Oct. 9, 2007.

(51) Int. Cl.
*A01K 29/00* (2006.01)
(52) U.S. Cl. .............. 119/28.5; 5/93.1; 5/93.2; 5/95
(58) Field of Classification Search .......... 119/28.5; 5/93.1, 93.2, 95, 96, 97, 98.1, 99.1, 100
See application file for complete search history.

(56) References Cited

U.S. PATENT DOCUMENTS

| | | | |
|---|---|---|---|
| 2,238,982 A * | 4/1941 | Norton | 119/28.5 |
| 5,241,716 A | 9/1993 | Kohus | |
| 5,581,827 A | 12/1996 | Fong et al. | |
| 5,845,349 A * | 12/1998 | Tharalson et al. | 5/99.1 |
| 6,148,456 A * | 11/2000 | Tharalson et al. | 5/99.1 |
| 6,338,314 B1 * | 1/2002 | Widrich | 119/28.5 |
| 6,851,135 B1 * | 2/2005 | Chen | 5/99.1 |
| 6,907,842 B2 * | 6/2005 | Godshaw | 119/28.5 |
| 7,415,739 B2 * | 8/2008 | Tharalson et al. | 5/95 |
| 2005/0051106 A1 * | 3/2005 | Tulgren et al. | 119/28.5 |
| 2006/0042548 A1 * | 3/2006 | Tharalson et al. | 119/28.5 |
| 2007/0056097 A1 * | 3/2007 | Martin et al. | 5/93.1 |
| 2007/0271697 A1 * | 11/2007 | Martin | 5/93.2 |

* cited by examiner

*Primary Examiner* — Joshua J Michener
*Assistant Examiner* — Justin Benedik
(74) *Attorney, Agent, or Firm* — Chen Yoshimura LLP

(57) ABSTRACT

A pet co-sleeper is designed to be connected to a human's bed for use by small to medium sized animals. Pets such as dogs and cats can use this sleeper to sleep beside their owners instead of on the bed. The pet co-sleeper has a frame which is substantially rectangular in shape. The frame has three horizontal bars forming a three-sided top frame and a fourth horizontal bar on the fourth side is lower than the other three horizontal bars. Fabric materials attached to the frame form a floor, four side walls and a horizontal divider located just below the fourth horizontal bar. A first mattress is placed over the horizontal divider to form a sleeping surface. A second mattress is placed on the fabric floor, such that the four side walls, the second mattress and the horizontal divider form a pet house.

11 Claims, 2 Drawing Sheets

PET CO-SLEEPER

This application claims priority from U.S. Provisional Patent Application No. 60/978,734 filed Oct. 9, 2007, which is herein incorporated by reference in its entirety.

BACKGROUND AND SUMMARY OF THE INVENTION

This invention relates to a pet co-sleeper that can be placed adjacent a human bed.

An object of the present invention is to provide a pet co-sleeper that offers an alternative to having pets sleep in the beds of their owners.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, the present invention provides a pet co-sleeper which includes: four vertical bars; four horizontal bars each connected between two adjacent vertical bars, wherein three of the horizontal bars are connected near upper ends of the vertical bars to form a three-sided top frame and a fourth one of the horizontal bars is located lower than the other three horizontal bars; a side cover attached to the four vertical bars to form four side walls, the side cover extending from near lower ends of the vertical bars to the horizontal bars; a horizontal divider jointed to the side cover and located lower than the fourth horizontal bar; a first mattress placed over the horizontal divider; a bottom support located near the lower ends of the vertical bars; and a second mattress placed over the bottom support, wherein the four side walls, the second mattress and the horizontal divider form a pet house.

It is to be understood that both the foregoing general description and the following detailed description are exemplary and explanatory and are intended to provide further explanation of the invention as claimed.

DETAILED DESCRIPTION OF THE PREFERRED EMBODIMENTS

The pet co-sleeper is designed to be connected to a human's bed for use by small to medium sized animals. Pets such as dogs and cats can use this sleeper to sleep beside their owners instead on of the bed.

Figure 1:
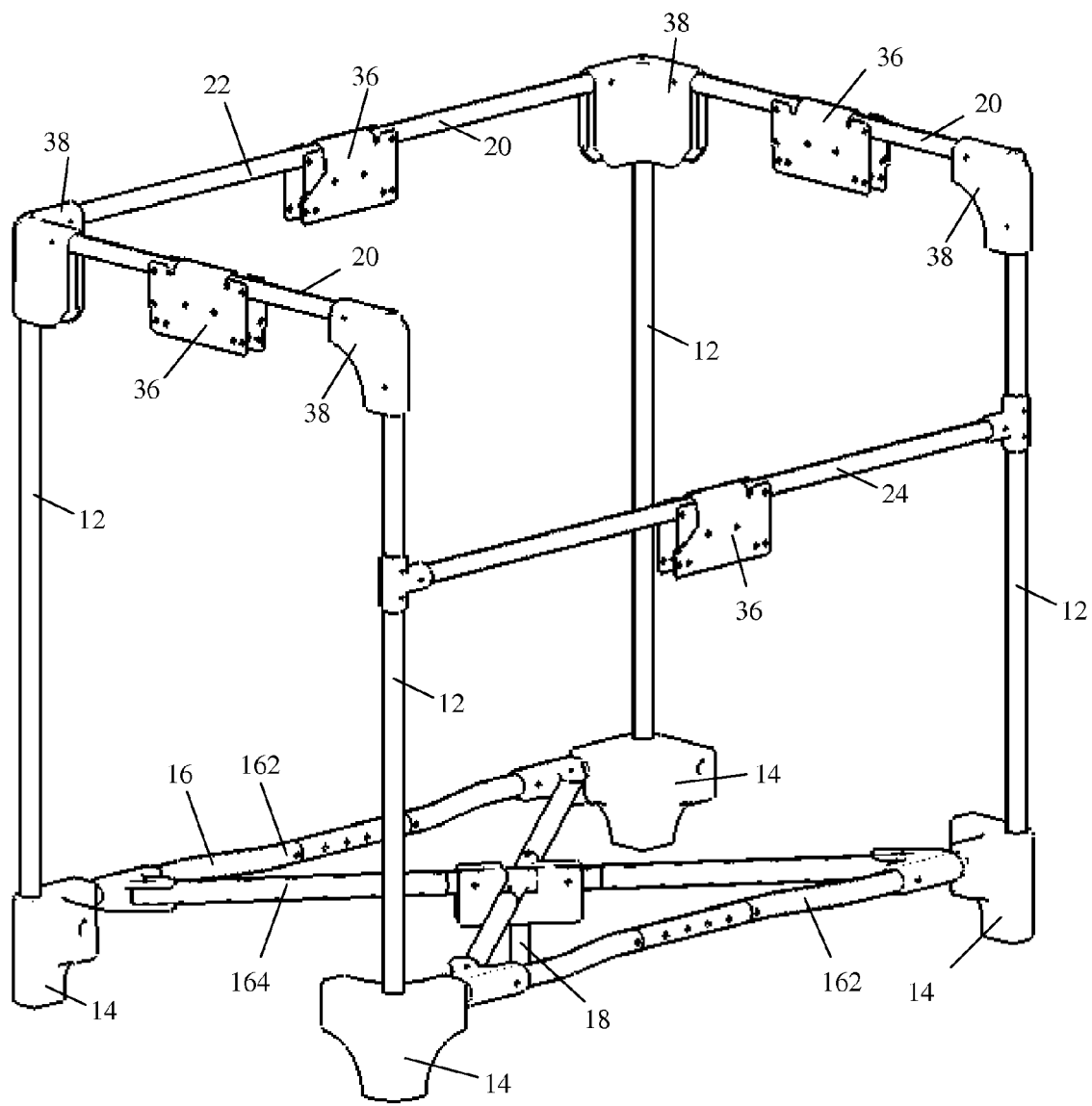
FIGS. 1 is a perspective view of the frame of a pet co-sleeper according to an embodiment of the present invention.
Figure 2:
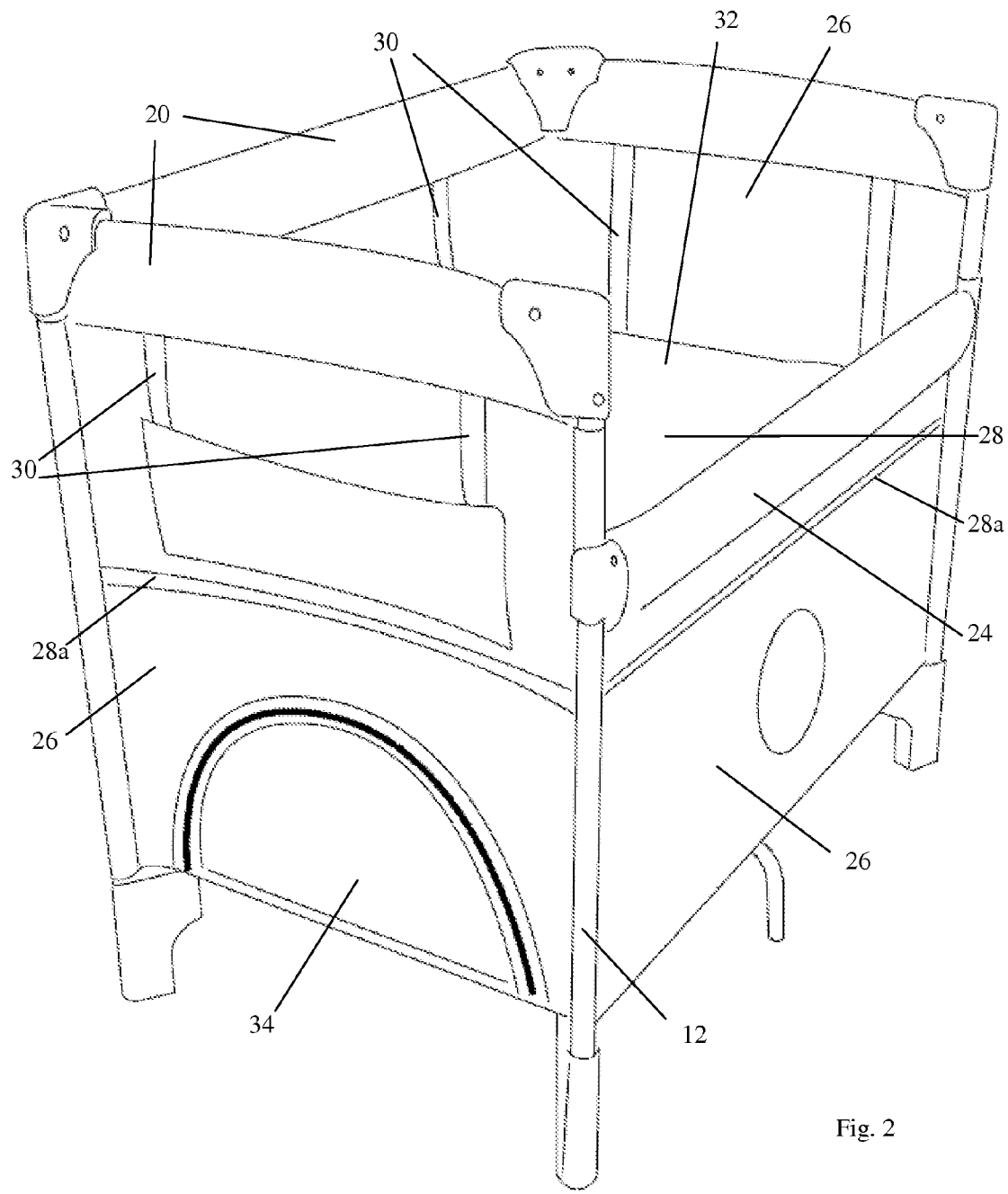
FIG. 2 shows the pet co-sleeper with a fabric cover and a mattress.

FIG. 1 shows the frame of the pet co-sleeper, which is substantially rectangular in shape. It has four vertical bars 12 each having a foot 14 at its end for resting on the floor. The four feet 14 are connected together by a reinforcing frame 16. In the illustrated embodiment, the reinforcing frame 16 includes two bars 162 each joining a pair of adjacent feet and two diagonal bars 164. A fifth foot 18 is optionally provided at the joining point of the diagonal bars 164. Three horizontal bars 20 are connected together at the top of the vertical bars 12 to form a three-sided top frame 22. A fourth horizontal bar (a cross bar) 24 is connected to two vertical bars 12 on the fourth side but is located lower than the top frame 22. In a preferred embodiment, the vertical and horizontal bars 12, 20 and 24, and the reinforcing frame 16 are made of a tubular metal material, As shown in FIG. 2, the four vertical sides of the sleeper are covered with a side cover 26 from the feet 14 up to the horizontal bars 20 and 24. The side cover is preferably made of a durable fabric material. The side cover 26 is attached to the vertical bars 12 and the horizontal bars 20 and 24. Alternatively, the side cover 26 may be attached only to the vertical bars 12. A horizontal divider 28 is joined to the side cover 26 at a location slightly below the fourth horizontal bar 24. In the embodiment shown in FIG. 2, the seams where the horizontal divider 28 is joined to the side cover 26 are indicated by the reference symbol 28a. In one embodiment, the horizontal divider 28 is a piece of fabric. In another embodiment, the horizontal divider 28 is a piece of fabric, and a plurality of webbings 30 (preferably made of nylon) are stitched inside the side cover 26 and the horizontal divider 28 and attached to the horizontal bars 20 and 24 to provide strength. In another embodiment, the horizontal divider 28 is formed by the webbings extending between the side covers 26 but without a horizontal fabric piece.

A first mattress 32 is placed on the horizontal divider to form a sleeping surface, which is at approximately the same height as a typical human bed (approximately 24 inches).

In one embodiment, a bottom support (not shown in the figures) is joined to the side cover 26 or the vertical bars 12 and is located just above the feet 14. In a preferred embodiment, the bottom support is a horizontal floor made of a fabric material and joined to the fabric side cover 26. A second mattress (not shown in the figures) is placed near the bottom of the sleeper frame and is supported by the bottom support (the horizontal floor) and/or the reinforcing frame 16. The space between the horizontal divider 28 and second mattress forms a pet house. One or more doors 34 (such as zippered doors) are provided on the side cover 26.

In the preferred embodiment, the sleeper is approximately 20×40 inches in size and 30 inches in height at the three-sided top frame 22.

In one embodiment, the frame of the pet co-sleeper is collapsible and portable. Each of the horizontal bars 20 and 24 is formed of two segments pivotally connected together by a fold joint 36 (see FIG. 1). Joining blocks 38 are provided to connect segments of the horizontal bars 20 to the vertical bars 12, and allow the segments to pivot relative to the vertical bars.

It will be apparent to those skilled in the art that various modification and variations can be made in the pet co-sleeper of the present invention without departing from the spirit or scope of the invention. Thus, it is intended that the present invention cover modifications and variations that come within the scope of the appended claims and their equivalents.

What is claims is:
1. A pet co-sleeper comprising:
   four vertical bars;
   four horizontal bars each connected between two adjacent vertical bars, wherein three of the horizontal bars are connected near upper ends of the vertical bars to form a three-sided top frame and a fourth one of the horizontal bars is located lower than the other three horizontal bars;
   a side cover made of a fabric material attached to the four vertical bars to form four side walls, the side cover extending from near lower ends of the vertical bars to the horizontal bars;

a horizontal divider including a fabric material permanently sewn to the side cover and supported solely by the side cover;

a bottom support located near the lower ends of the vertical bars; and wherein the side cover, the bottom support and the horizontal divider form a pet house.

2. The pet co-sleeper of claim 1, further comprising a reinforcing frame connected to the vertical bars near their lower ends.

3. The pet co-sleeper of claim 1, further comprising four feet each attached to the lower end of a vertical bar.

4. The pet co-sleeper of claim 1, wherein the four vertical bars and four horizontal bars are made of a tubular metal material.

5. The pet co-sleeper of claim 1, wherein the divider includes a plurality of webbings extending between the side cover.

6. The pet co-sleeper of claim 5, wherein the webbings are stitched inside the side cover.

7. The pet co-sleeper of claim 1, wherein at least one of the side walls is provided with a door.

8. The pet co-sleeper of claim 1, wherein the vertical bars are about 30 inches long.

9. The pet co-sleeper of claim 1, wherein the horizontal divider is located lower than the fourth horizontal bar.

10. The pet co-sleeper of claim 1, further comprising a first mattress placed over the horizontal divider.

11. The pet co-sleeper of claim 1, further comprising a second mattress placed over the bottom support.

* * * * *